US011429857B2

(12) United States Patent
van der Made et al.

(10) Patent No.: US 11,429,857 B2
(45) Date of Patent: Aug. 30, 2022

(54) SECURE VOICE SIGNATURE COMMUNICATIONS SYSTEM USING LOCAL AND REMOTE NEURAL NETWORK DEVICES

(71) Applicant: BrainChip, Inc., Aliso Viejo, CA (US)

(72) Inventors: Peter A J van der Made, Aliso Viejo, CA (US); Anil Shamrao Mankar, Aliso Viejo, CA (US)

(73) Assignee: BrainChip, Inc., Laguna Hills, CA (US)

( * ) Notice: Subject to any disclaimer, the term of this patent is extended or adjusted under 35 U.S.C. 154(b) by 812 days.

(21) Appl. No.: 16/282,550

(22) Filed: Feb. 22, 2019

(65) Prior Publication Data

US 2019/0188600 A1    Jun. 20, 2019

Related U.S. Application Data

(63) Continuation of application No. 14/753,296, filed on Jun. 29, 2015, now abandoned.
(Continued)

(51) Int. Cl.
*G06N 3/08* (2006.01)
*G06N 20/00* (2019.01)
*G06N 3/04* (2006.01)

(52) U.S. Cl.
CPC ............ *G06N 3/08* (2013.01); *G06N 3/049* (2013.01); *G06N 20/00* (2019.01)

(58) Field of Classification Search
CPC .......... G06N 99/005; G06N 3/08; G06N 3/04; G06N 3/049; G06N 3/063; G06N 3/02;
(Continued)

(56) References Cited

U.S. PATENT DOCUMENTS 5,537,394 A    7/1996    Abe et al.
6,173,074 B1    1/2001    Russo
(Continued)

OTHER PUBLICATIONS

Tuci et al. "Evolution of Acoustic Communication Between Two Cooperating Robots", TR/ITIDIA/2007-013, 2017, p. 11.*
(Continued)

*Primary Examiner* — Li Wu Chang
(74) *Attorney, Agent, or Firm* — Sterne, Kessler, Goldstein & Fox P.L.L.C.

(57) ABSTRACT

Disclosed herein are system and method embodiments for establishing secure communication with a remote artificial intelligent device. An embodiment operates by capturing an auditory signal from an auditory source. The embodiment coverts the auditory signal into a plurality of pulses having a spatio-temporal distribution. The embodiment identifies an acoustic signature in the auditory signal based on the plurality of pulses using a spatio-temporal neural network. The embodiment modifies synaptic strengths in the spatio-temporal neural network in response to the identifying thereby causing the spatio-temporal neural network to learn to respond to the acoustic signature in the acoustic signal. The embodiment transmits the plurality of pulses to the remote artificial intelligent device over a communications channel thereby causing the remote artificial intelligent device to learn to respond to the acoustic signature, and thereby allowing secure communication to be established with the remote artificial intelligent device based on the auditory signature.

20 Claims, 3 Drawing Sheets

Related U.S. Application Data

(60) Provisional application No. 62/019,399, filed on Jun. 30, 2014, provisional application No. 62/018,562, filed on Jun. 28, 2014.

(58) Field of Classification Search
CPC .. G06N 3/0445; G06N 3/0454; G06N 3/0481; G06N 99/007; G06F 17/30707; G06F 17/30743; G06F 17/30758; G06F 17/30761; G06K 9/6269; G06K 9/4628; G06K 9/6232
See application file for complete search history.

(56) References Cited

U.S. PATENT DOCUMENTS

| | | | |
|---|---|---|---|
| 7,734,340 B2 | 6/2010 | De Ridder | |
| 7,774,440 B1 | 8/2010 | Bagrodia et al. | |
| 8,111,174 B2 | 2/2012 | Berger et al. | |
| 8,250,011 B2 | 8/2012 | van der Made | |
| 8,346,692 B2 | 1/2013 | Rouat et al. | |
| 8,682,822 B2 | 3/2014 | Modha et al. | |
| 2013/0297537 A1 | 11/2013 | van der Made | |
| 2013/0325777 A1 | 12/2013 | Petre et al. | |
| 2014/0016858 A1 | 1/2014 | Richert | |
| 2014/0114975 A1* | 4/2014 | Rouat | G06N 3/049 707/737 |
| 2015/0269481 A1 | 9/2015 | Annapureddy et al. | |
| 2015/0379397 A1 | 12/2015 | van der Made et al. | |

OTHER PUBLICATIONS

Smith, Richard L., "Acoustic Signature of Birds, Bats, Bells and Bearings", presented at the Anual Vibration Institute Meeting, Dearborn, MI, Jun. 23, 1998, 6 pages.

Chan et al., "AER EAR: A Matched Silicon Cochlea Pair with Address Event Representation Interface", IEEE TCS-I, 2007, pp. 48-59.

Kasabov et al., "Dynamic Evolving Spiking Neural Networks for On-Line Spatio- and Spectro-Temporal Pattern Recognition", Neural Networks 41 (2013), pp. 188-201.

* cited by examiner

SECURE VOICE SIGNATURE COMMUNICATIONS SYSTEM USING LOCAL AND REMOTE NEURAL NETWORK DEVICES

CROSS-REFERENCES TO RELATED APPLICATIONS

This application is a continuation of U.S. patent application Ser. No. 14/753,296, filed Jun. 29, 2015, now pending, which claims benefit to U.S. Provisional Patent Application Ser. No. 62/018,562, filed on Jun. 28, 2014, and claims benefit to U.S. Provisional Patent Application Ser. No. 62/019,399, filed on Jun. 30, 2014, the disclosures of each of which are hereby incorporated by reference in their entirety.

FIELD OF INVENTION

The present invention generally relates to communications system over a communication network. In particular, the present invention relates to a system and method to couple two or more parts of a spatio-temporal spiking neural network, such as to provide acoustic signature identification or other cognitive tasks and the related communications between two or more components of a spatio-temporal spiking neural network.

BACKGROUND OF INVENTION

Neural networks have been around since the mid-1940's. Since then, many different neural models have been conceived with the aim to reproduce the considerable cognitive powers of the brain. These Artificial Neural Networks vary from simple sigmoid networks (perceptron) to complex biologically-accurate Spatio-temporal Spiking Neural Networks. It becomes increasingly difficult to determine the distinctions between these networks. For the purpose of clarity, Neural Networks can be divided into four distinct groups;
  Computer software neural networks also referred to as 'Sigmoid Networks'
  Computer software simulation of biologically realistic neural networks
  Analog hardware emulation of a sigmoid networks or spiking neural networks
  Digital hardware logic emulation of sigmoid networks or spiking neural networks Within each of these categories a number of variations exist that differ in accuracy and computational efficacy. Computer software neural networks generally exist of sigmoid function neurons wherein activated values are added and a non-linear mathematical function, such as a logistics function, is applied to the sum. Computer software simulations of biologically accurate neuron models, such as the Hodgkin-Huxley model of the giant squid neuron, focus on building accurate mathematical models of biological networks. In Analog hardware networks, a model is constructed in VLSI, consisting of transistors that behave more or less like synapses and an Integrate and Fire neural network. In Digital hardware emulation, the same is accomplished using logic gates. Each variation has its specific advantages and application areas.

The above mentioned technologies lack in efficiently capturing the dynamics of a biological neuronal networks, including spike-timing dependent plasticity, the effects of neurotransmitters and neuromodulators and diverse spike timing representations. Further, the present technologies do not provide computational retrieving and storing learned tasks, so that they may be able to be re-learned by another dynamic neural network. Additionally, the technologies lack in fast speeds and stability.

Further, the present technologies do not describe communications between two or more components of artificial neural network, that may be implemented in various applications, such as communication to a remote neural network irrespective of the location, controlling and analyzing a connected appliance or equipment.

Therefore, there exist a need to provide a system and a method to capture dynamics of biological neuronal networks, including spike-timing dependent plasticity, and couple two or more parts of a spatio-temporal spiking neural network, such as to provide cognitive tasks, and resultantly provide communication between them.

SUMMARY OF INVENTION

Therefore, the present invention relates to a system and a method for providing communication between two or more components of a spatio-temporal spiking neural network, such as to provide acoustic signature identification or other cognitive tasks and the related communications between two or more components of a spatio-temporal spiking neural network.

An embodiment of the present invention provides an apparatus for identifying and learning acoustic signature of a plurality of auditory signals comprising: an input sensor configured to capture a varying potential produced in the plurality of auditory signals from an auditory source; a series of resonators configured to convert the varying potential into a plurality of streams of electrical pulses with spatio-temporal distribution; an artificial intelligent device identifies one or more features of the pulse streams of acoustic signals, representing the acoustic signature, by association in a dynamic spatio-temporal neural network; and the artificial intelligent device learns to respond to the acoustic signature of the acoustic signals by modifying synaptic strengths in the dynamic spatio-temporal neural network.

Another embodiment of the present invention provides a communication system comprising: a first artificial intelligent device consisting of a dynamic spatio-temporal neural network configured to receive and learn from a plurality of pulse streams of acoustic signals with spatio-temporal distribution; and at least one remote artificial intelligent device consisting of a dynamic spatio-temporal neural network communicating with the first artificial intelligent device, through a communication channel, configured to receive and respond to the pulse streams.

Yet another embodiment of the invention provides a method for identifying and learning acoustic signature of a plurality of auditory signals comprising: capturing, by an input sensor, a varying potential produced in the plurality of auditory signals from an auditory source; converting the varying potential into a plurality of streams of electrical pulses with spatio-temporal distribution, by a series of resonators; identifying, by an artificial intelligent device, one or more features of the pulse streams of acoustic signals, representing the acoustic signature, through association in a dynamic spatio-temporal neural network; and learning, by the artificial intelligent device, to respond to the acoustic signature of the acoustic signals by modifying synaptic strengths in the dynamic spatio-temporal neural network.

An embodiment of the present invention discloses communication to a remote spatio-temporal spiking neural network for receiving spatio-temporal pulse streams via a parallel or serial communication such as the Internet.

Another embodiment of the present invention discloses a communication system in order to analyze and control an appliance irrespective of the location.

Yet another embodiment of the present invention provides a secure communication system because each spatio-temporal neural network is trained to respond to a unique voice signature.

DETAILED DESCRIPTION OF THE INVENTION

Figure 1:
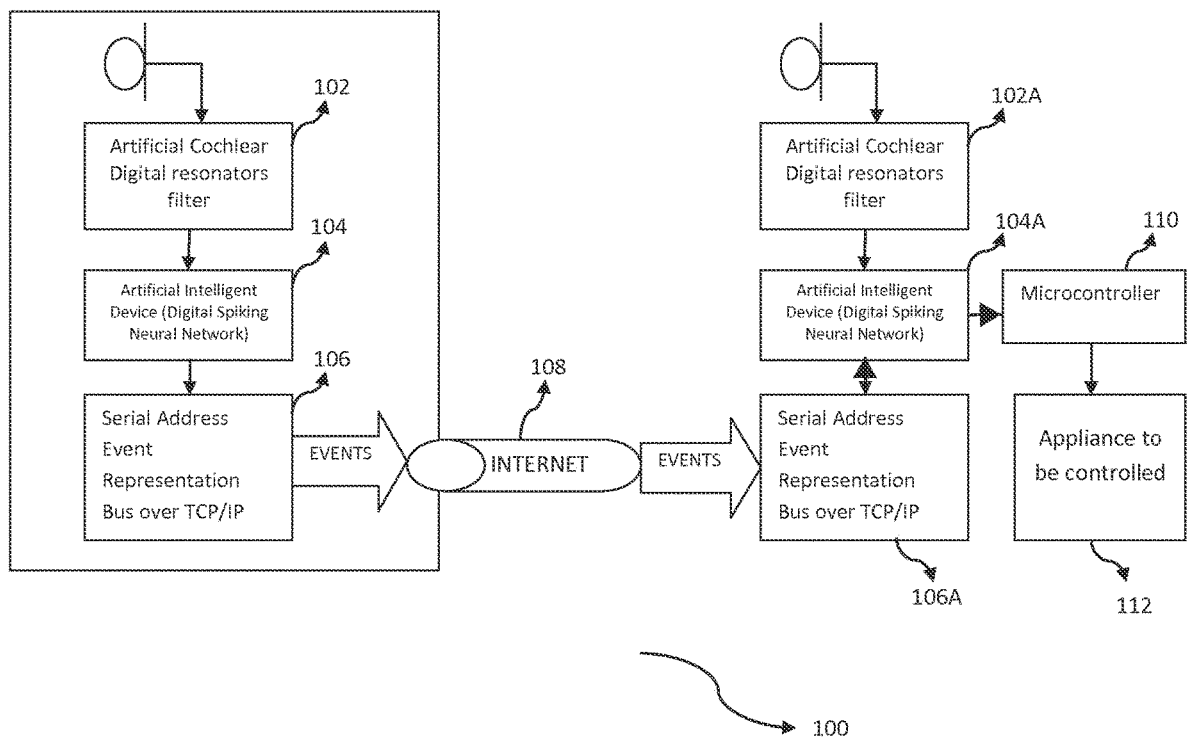
FIG. 1 illustrates a system for communicating two or more components of a dynamic spatio-temporal neural network, in accordance with an embodiment of the present invention.

In the following detailed description of embodiments of the invention, numerous specific details are set forth in order to provide a thorough understanding of the embodiment of invention. However, it will be obvious to a person skilled in art that the embodiments of invention may be practiced with or without these specific details. In other instances well known methods, procedures and components have not been described in details, so as not to unnecessarily obscure aspects of the embodiments of the invention.

Furthermore, it will be clear that the invention is not limited to these embodiments only. Numerous modifications, changes, variations, substitutions and equivalents will be apparent to those skilled in the art, without parting from the spirit and scope of the invention.

According to the present invention, the Dynamic Spatio-Temporal Neural Network model described here captures the dynamics of biological neuronal networks, including spike-timing dependent plasticity, the effects of neurotransmitters and neuromodulators and diverse spike timing representations, allowing the model to perform functions that are presently beyond the scope of Artificial Neural Networks.

The Digital neural spiking neural networks and particularly the Dynamic Spatio-Temporal Neural Network offer a number of advantages over the prior art technologies. The neural model exhibits higher speed, excellent stability and very low power dissipation due to an asynchronous digital organization, with a further advantage that learned functions can be computationally retrieved and stored. Similar network models and libraries are disclosed in U.S. Pat. No. 8,250,011 and US Pub. No. 2013/0297537, both of which were invented by the current inventor incorporated by reference herein.

Power dissipation is extremely low. The digital circuit is very stable and its behavior is completely repeatable. Its characteristics are not dependent on any process technology. The neural model is elaborate, including the effects of spike interval neurotransmitter reuptake, leakage currents, synaptic plasticity, and threshold plasticity.

Learning takes place through the modification of neurotransmitter levels resulting from feedback from the postsynaptic neuron, and the intensity of input spikes. Synaptic variables can be computationally retrieved through a microprocessor interface enabling the storage and subsequent reuse of learned tasks.

In the present invention, a system is provided that comprises an artificial intelligent device, consisting of dynamic spatio-temporal neural network, for identifying cognitive signals and learning the ways to respond to the cognitive signals. Further, the system provides for transmitting the signals to and hence, communicating with a remote artificial intelligent device, consisting of dynamic spatio-temporal neural network, over a communication protocol, such as the Internet. Additionally, the system disclosed in the present invention provides for analyzing and controlling one or more appliances from a remote location. Due to the communication protocol, the Internet, a user may be able to analyze or control his/her appliances from a remote location also by utilizing the artificial intelligent device of dynamic spatio-temporal neural network that recognizes, identifies and learns to respond in a particular way to particular signals with respect to a particular user.

FIG. 1 illustrates a system for communicating two or more components of a dynamic spatio-temporal neural network, in accordance with an embodiment of the present invention.

The present invention provides a system comprising an artificial intelligent device 104 of dynamic spatio-temporal neural network. The artificial intelligent device 104 receives a plurality of input pulses in form of stimuli. Stimuli may be in form of auditory signals, human speech, animal, or any object, or any other type of stimuli generated from different event such as, object recognition, hand or body movement, and others. The system 100 relates to an artificial device 104 that receives input pulses in the form of auditory signals, and recognizes and identifies the input signals by implementing the spatio-temporal neural network comprised in the artificial intelligent device 104. Subsequently, the artificial intelligent device 104 learns to respond to the input pulses.

In biological sound sensing system, sound produces pressure waves in a cochlear that stimulates sensory neurons. The sensory neurons each produce a potential that varies at the same rate as the sound pressure waves of various frequencies. Since the artificial neural network approximates the biological neural network, the artificial intelligent device 104 receives plurality of input pulses, in the form of acoustic signals or sound waves.

One or more acoustic signals are captured by an input sensor from an auditory source such as the human voice, animal or insect activity or mechanical vibration. The input sensor is further connected to an artificial cochlear 102 consisting of a series of resonators. The sound waves in the acoustic signals produces pressure waves in the artificial cochlear 102 that stimulates sensory neurons in the cochlear 102. As mentioned above, the sensory neurons each produce a potential that varies at the same rate as the sound pressure waves of various frequencies. The artificial cochlear 102 outputs a plurality of pulse patterns with a spatio-temporal distribution that is indicative of features in the acoustic signals. The artificial cochlear 102 connects to a first artificial intelligent device 104. The first artificial intelligent device 104 consists of a spatio-temporal neural network.

The varying potential produced at the artificial cochlear 102 connects to a series of resonators that approximates the function of hair cells in the biological cochlear, producing a series of spatio-temporal pulses that are equivalent to the action potentials in the biological cochlear nerve. Further, the pulse streams with a spatio-temporal distribution are input to the connected artificial intelligent device 104 that consists of a Spatio-Temporal Neural Network. The Spatio-Temporal Neural Network in the artificial intelligent device 104 is subsequently trained to respond to a limited set of acoustic signatures.

The method of identifying acoustic signatures is by association in a Dynamic Spatio-Temporal Neural Network. Each synapse circuit in the Spatio-Temporal Neural Network of the artificial intelligent device 104 performs a temporal integration function on a single pulse stream. The Dendrite is a mechanism that provides spatial integration functions in a biological neuron. In the Spatio-Temporal Neural network, the values resulting from temporal integration in each artificial synapse circuit, the result of pulse interval and pulse frequency are integrated in an artificial dendrite circuit. Multiple synapse circuits are connected to each dendrite circuit, each synapse generating a single value. These values are spatially integrated in the dendrite circuit. One or more dendrite circuits connect to a soma circuit. In biological neurons, the soma consists of the nucleus of the cell and performs a global integration function. The artificial soma circuit integrates the values from a plurality of dendric circuits. The soma circuit connects to an n artificial axon circuit generates an output pulse sequence that is proportional to the total of integrated dendric values.

Synapses receive feedback from the Post Synaptic Neuron. The state of synapse circuit is changed according to the timing of input and feedback pulses. This comprises a learning function, known as Synaptic Time Dependent Plasticity. In this way by means of Synaptic Time Dependent Plasticity, the spatio-temporal neural network of the artificial intelligent device 104 is trained by exposing it to acoustic pattern information through the input sensor. Once a particular acoustic signature has been learned, the learning function can be mitigated by applying a value that represents a Neuromodulator. The acoustic signature is internally represented as pulses, also known as spikes, with spatio-temporal distribution.

Therefore, the system 100 provides an artificial intelligent device 104 consisting of spatio-temporal neural network that recognizes and identifies acoustic signature in one or more auditory signals. Subsequently, the artificial intelligent device 104 learns to respond to the auditory signals.

Further, the present invention also provides the system 100 to couple two or more parts/components of a spatio-temporal spiking neural network comprised in an artificial intelligent device, such as to provide acoustic signature identification or other cognitive tasks and the related communications between two or more components of a spatio-temporal spiking neural network. Each component comprises a plurality of neural processing cores and synaptic memory.

The system 100 provides connecting two or more parts or components of a distributed and spatio-temporal spiking neural network, comprised in the artificial intelligent devices, by some means of parallel or serial communication protocol 108, such as the Internet. In an embodiment, the communication protocol may be Intranet or a fast serial bus. A plurality of spike times, originating neuron and destinations, are transmitted as packets of information, and feedback from a remote spiking neural network is received as packets of information. The protocol for these packets of information can be any established standard, including but not limited to PCI (Peripheral Component Interconnect), PCIe (PCI express), USB (Universal Serial Bus), or TCP (Transmission Control Protocol).

As described above in FIG. 1, a distributed spiking neural network of the artificial intelligent device 104 is used in the recognition and identification of acoustic signals using acoustic signature recognition by means of a spatio-temporal neural network, in accordance with an embodiment of the present invention. Further, referring to FIG. 1, the first artificial intelligent device 104 connects to a remote artificial intelligent device 104A via a Serial Address Event Representation Bus 106, over the TCP/IP 108. The pulse stream patterns with spatio-temporal distribution generated at the first artificial intelligent device 104 defining the features of the events of the input pulses are transmitted to the remote artificial intelligent device 104A. The pulse stream patterns with spatio-temporal distribution consist of the pulse timing and spatial distribution that transmit key aspects of the acoustic signature in the input auditory signals. The remote artificial intelligent device 104A receives spatio-temporal pulse streams via a Serial Address Event Representation 106A. After receiving the pulse stream patterns, the remote artificial intelligent device 104A recognizes, identifies the pulse stream patterns and learns to respond in the same as the first artificial intelligent device 104, by means of Synaptic Time Dependent Plasticity.

The pulse streams with spatio-temporal distribution communicate over two linked Address Event Representation (AER) busses (106 and 106A). The properties of the AER bus are that each activation event of an artificial neuron is represented as the address of that neuron. The matrix of parallel processing artificial neurons is indexed, with each artificial neuron assigned an index number. This index number represents its address. In an embodiment, the internal bus 106 is 16 bits wide and allows for 'near' connections, while the external serial bus 106A contains a 40 bits address field, allowing a maximum of 240 connections. The communications protocol 108 is optimized to avoid bus contention. In a preferred embodiment, the serial AER communication bus 106 is connected to a remote Dynamic Spatio-Temporal Neural network of a remote artificial intelligent device 104A through a communication link, such as the Internet 108. The remote Dynamic Spatio-Temporal Neural Network of the remote artificial intelligent device 104A has the same structure as of the Dynamic Spatio-Temporal Neural Network of the first artificial intelligent device 104.

In an embodiment, the remote artificial intelligent device 104A connects to a computing device for the purpose of analysis or controlling an appliance. The remote artificial intelligent device 104A connects with a microprocessor 110 that further is connected with one or more appliances that need to be controlled remotely.

Therefore, the system 100 provides a communication system for connecting two or more components a distributed spatio-temporal neural network comprised in one or more artificial devices, where the input spikes is communicated in a communication protocol over the Internet 108, so that physical layers of the artificial neural networks can be separated by miles but still be part of the same network.

Figure 2:
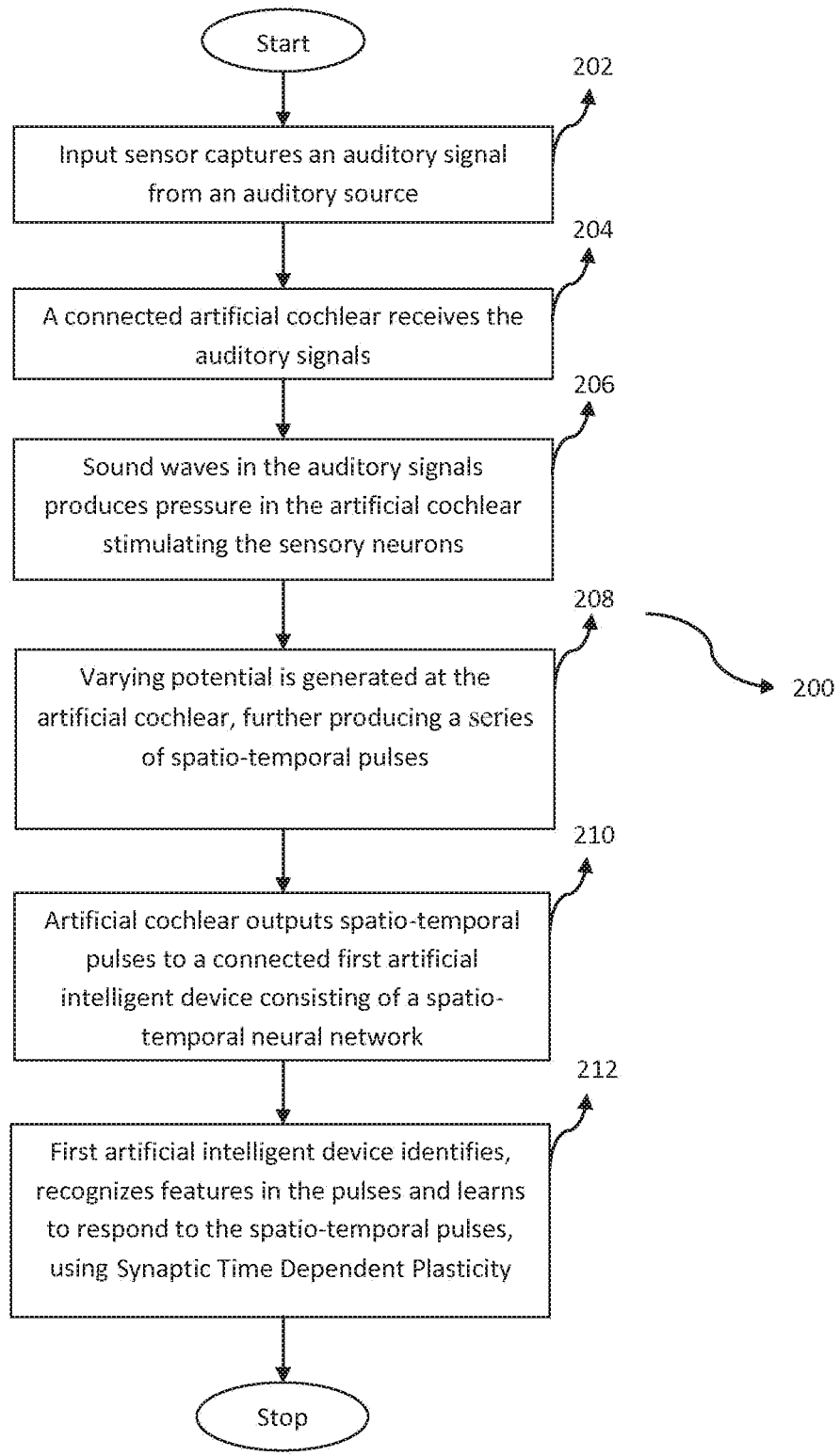
FIG. 2 illustrates a method of learning and identifying acoustic signature of auditory signals using a dynamic spatio-temporal neural network, in accordance with an embodiment of the present invention.

FIG. 2 illustrates a method of learning and identifying acoustic signature of auditory signals using a dynamic spatio-temporal neural network, in accordance with an embodiment of the present invention. According to the present invention, an artificial intelligent device 104 identifies and recognizes features in a plurality of spatio-temporal pulses received by it, implementing Synaptic Time Dependent Plasticity. The artificial intelligent device 104 comprises of a dynamic spatio-temporal neural network.

The artificial intelligent device 104 receives a plurality of input pulses in form of stimuli. Stimuli may be in form of auditory signals, human speech, animal, or any object, or any other type of stimuli generated from different event such as, object recognition, hand or body movement, and others.

According to the method 20X), an input sensor captures a plurality of acoustic signals from an auditory source such as the human voice, animal or insect activity or mechanical vibration, at step 202. An artificial cochlear 102 is further connected to the input sensor, where the artificial cochlear 102 consists of a series of resonators. The artificial cochlear 102 receives the acoustic signals from the input sensor, at step 204. The sound waves in the acoustic signals produces pressure waves in the artificial cochlear 102 that stimulates sensory neurons in the cochlear 102, at step 206. Thereafter, at step 208, the sensory neurons of the artificial cochlear 102 each produce a potential that varies at the same rate as the sound pressure waves of various frequencies. The varying potential produced at the artificial cochlear 102 connects to a series of resonators that approximates the function of hair cells in the biological cochlear, producing a series of spatio-temporal pulses that are equivalent to the action potentials in the biological cochlear nerve.

Further at step 210, the artificial cochlear 102 outputs a plurality of pulse patterns with a spatio-temporal distribution that is indicative of features in the acoustic signals. The artificial cochlear 102 connects to a first artificial intelligent device 104. The first artificial intelligent device 104 consists of a spatio-temporal neural network. The Spatio-Temporal Neural Network in the artificial intelligent device 104 is subsequently trained to respond to a limited set of acoustic signatures.

After receiving a series of spatio-temporal neural network, at step 212, the artificial intelligent device 104 of spatio-temporal neural network recognizes and identifies the acoustic signatures in the auditory signals by association in a dynamic spatio-temporal neural network. Each synapse circuit in the Spatio-Temporal Neural Network of the artificial intelligent device 104 performs a temporal integration function on a single pulse stream. The Dendrite is a mechanism that provides spatial integration functions in a biological neuron. In the Spatio-Temporal Neural network, the values resulting from temporal integration in each artificial synapse circuit, the result of pulse interval and pulse frequency are integrated in an artificial dendrite circuit. Multiple synapse circuits are connected to each dendrite circuit, each synapse generating a single value. These values are spatially integrated in the dendrite circuit. One or more dendrite circuits connect to a soma circuit. In biological neurons, the soma consists of the nucleus of the cell and performs a global integration function. The artificial soma circuit integrates the values from a plurality of dendric circuits. The soma circuit connects to an n artificial axon circuit generates an output pulse sequence that is proportional to the total of integrated dendric values.

Synapses receive feedback from the Post Synaptic Neuron. The state of synapse circuit is changed according to the timing of input and feedback pulses. This comprises a learning function, known as Synaptic Time Dependent Plasticity. In this way by means of Synaptic Time Dependent Plasticity, the spatio-temporal neural network of the artificial intelligent device 104 is trained by exposing it to acoustic pattern information through the input sensor. Once a particular acoustic signature has been learned at step 212, the learning function can be mitigated by applying a value that represents a Neuromodulator. The acoustic signature is internally represented as pulses, also known as spikes, with spatio-temporal distribution.

Figure 3:
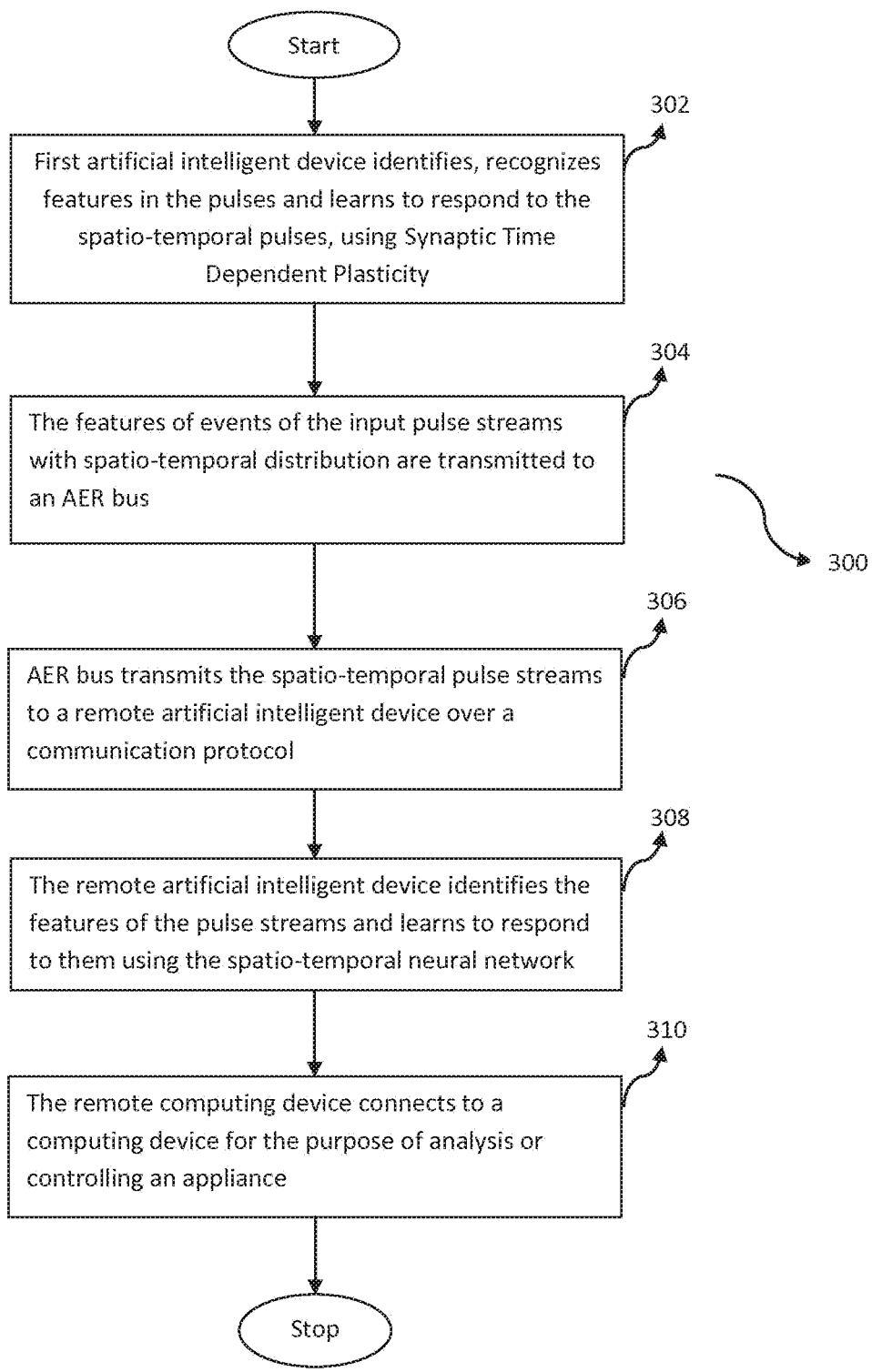
FIG. 3 illustrates a method of communicating two or more components of a dynamic spatio-temporal neural network, in accordance with an embodiment of the present invention.

FIG. 3 illustrates a method of communicating two or more components of a dynamic spatio-temporal neural network, in accordance with an embodiment of the present invention. The present invention also provides a method for communication between two or more components a distributed spatio-temporal neural network comprised in one or more artificial devices. The communication occurs by a means of parallel or serial communication protocol 108, such as the Internet. A plurality of spike times, originating neuron and destinations, are transmitted as packets of information, and feedback from a remote spiking neural network is received as packets of information. The protocol for these packets of information can be any established standard, including but not limited to PCI (Peripheral Component Interconnect), PCIe (PCI express), USB (Universal Serial Bus), or TCP (Transmission Control Protocol).

As shown in FIG. 3, the method 300 describes a step 302 where a first artificial intelligent device 104 recognizes and identifies plurality of acoustic signals using acoustic signature recognition by means of a spatio-temporal neural network. The first artificial intelligent device 104 connects to a remote artificial intelligent device 104A via a Serial Address Event Representation Bus 106, over the TCP/IP 108. The pulse stream patterns with spatio-temporal distribution generated at the first artificial intelligent device 104 defining the features of the events of the input pulses are transmitted to the Serial Address Event Representation (abbreviated as AER) Bus 106, over the TCP/IP 108, at step 304. The pulse stream patterns with spatio-temporal distribution consist of the pulse timing and spatial distribution that transmit key aspects of the acoustic signature in the input auditory signals.

Further, the AER bus transmits the pulse streams with spatio-temporal neural network to the remote artificial intelligent device 104A, at step 306. The remote artificial intelligent device 104A has the same structure as of the Dynamic Spatio-Temporal Neural Network of the first artificial intelligent device 104. The pulse streams with spatio-temporal distribution to communicate over two linked Address Event Representation (AER) busses (106 and 106A). The AER bus 106 and 106A represents each activation event of an artificial neuron as the address of that neuron. The matrix of parallel processing artificial neurons is indexed, with each artificial neuron assigned an index number. This index number represents its address. In an embodiment, the internal bus 106 is 16 bits wide and allows for 'near' connections, while the external serial bus 106A contains a 40 bits address field, allowing a maximum of 240 connections. The communications protocol 108 is optimized to avoid bus contention.

After receiving the pulse stream patterns, the remote artificial intelligent device 104A recognizes, identifies the pulse stream patterns and learns to respond in the same manner as the first artificial intelligent device 104, by means of Synaptic Time Dependent Plasticity, at step 308. In a further embodiment, the remote artificial intelligent device 104A is connected to a computing device for analysis and controlling of an appliance. Therefore, at step 310, the remote artificial intelligent device 104A connects with a microprocessor further is connected with one or more appliances that need to be controlled remotely.

Advantageously, the present invention provides a system 100 comprising artificial intelligent device 104 communicating with a remote artificial intelligent device 104A, where the remote artificial intelligent device 104A efficiently controls one or more appliances. Therefore, the system 100 controls the appliances from anywhere in the world using a user's device equipped with the first artificial intelligent device 104. Also, the system 100 provides secure communication, since each neural network in the artificial intelligent device is trained to a unique voice signature of its owner. Further, the transfer of pulse streams is in AER format, which contains voice signature of the user/owner in timing between pulses distribution.

We claim:

1. A system for establishing secure communication between a local neural network device and a remote neural network device, comprising:
   an input sensor configured to capture an auditory signal from an auditory source;
   an artificial cochlear communicatively coupled to the input sensor and configured to convert the auditory signal into a plurality of pulses having a spatio-temporal distribution; and
   the local neural network device communicatively coupled to the artificial cochlear and configured to:
      identify an acoustic signature in the auditory signal based on the plurality of pulses using a spatio-temporal neural network;
      modify synaptic strengths in the spatio-temporal neural network in response to the identifying, wherein the modifying causes the spatio-temporal neural network to learn to respond to the acoustic signature in the acoustic signal; and
      transmit the plurality of pulses from the local neural network device to the remote neural network device over a communications channel, wherein the transmitting causes the remote neural network device to learn to respond to the acoustic signature thereby allowing the local neural network device to establish secure communication with the remote neural network device based on the auditory signature.

2. The system of claim 1, the local neural network device further configured to:
   modify the synaptic strengths in the spatio-temporal neural network using Synaptic Time Dependent Plasticity (STDP).

3. The system of claim 1, the local neural network device further configured to:
   modify the synaptic strengths in the spatio-temporal neural network based on a value representing a neuromodulator in the spatio-temporal neural network.

4. The system of claim 1, wherein the auditory signal is a human speech.

5. The system of claim 1, the local neural network device further configured to:
   transmit the plurality of pulses to the remote neural network device over the communications channel using an Address Event Representation (AER).

6. The system of claim 1, the local neural network device further configured to:
   receive feedback from the remote neural network artificial intelligent device in response to the transmitting.

7. The system of claim 1, wherein the remote neural network device controls an appliance.

8. A method for establishing secure communication with a remote neural network device, comprising:
   capturing, by an input sensor, an auditory signal from an auditory source;
   converting, by an artificial cochlear communicatively coupled to the input sensor, the auditory signal into a plurality of pulses having a spatio-temporal distribution;
   identifying, by a local neural network device communicatively coupled to the artificial cochlear, an acoustic signature in the auditory signal based on the plurality of pulses using a spatio-temporal neural network;
   modifying, by the local neural network device, synaptic strengths in the spatio-temporal neural network in response to the identifying, wherein the modifying causes the spatio-temporal neural network to learn to respond to the acoustic signature in the acoustic signal; and
   transmitting, by the local neural network device, the plurality of pulses to the remote neural network device over a communications channel, wherein the transmitting causes the remote neural network device to learn to respond to the acoustic signature thereby allowing the local neural network device to establish secure communication with the remote neural network device based on the auditory signature.

9. The method of claim 8, the learning further comprising:
   modifying the synaptic strengths in the spatio-temporal neural network using Synaptic Time Dependent Plasticity (STDP).

10. The method of claim 8, the learning further comprising:
    modifying the synaptic strengths in the spatio-temporal neural network based on a value representing a neuromodulator in the spatio-temporal neural network.

11. The method of claim 8, wherein the auditory signal is a human speech.

12. The method of claim 8, the transmitting further comprising:
    transmitting the plurality of pulses to the remote neural network device over the communications channel using an Address Event Representation (AER).

13. The method of claim 8, further comprising:
    receiving feedback from the remote neural network device in response to the transmitting.

14. The method of claim 8, wherein the remote neural network device controls an appliance.

15. A first neural network device for establishing secure communication with a second neural network device, wherein the first neural network device is configured to:
    receive a plurality of pulses representing an auditory signal from the second neural network device over a communications channel, wherein the second neural network device has learned to respond to the acoustic signature, and the plurality of pulses have a spatio-temporal distribution;
    identify an acoustic signature in the auditory signal based on the plurality of pulses using a spatio-temporal neural network; and
    modify synaptic strengths in the spatio-temporal neural network in response to the identifying, wherein the modifying causes the spatio-temporal neural network to learn to respond to the acoustic signature in the acoustic signal thereby allowing the first neural network device to establish secure communication with the second neural network device based on the auditory signature.

16. The first neural network device of claim 15, further configured to:

modify the synaptic strengths in the spatio-temporal neural network using Synaptic Time Dependent Plasticity (STDP).

17. The first neural network device of claim 15, further configured to:
   modify the synaptic strengths in the spatio-temporal neural network based on a value representing a neuromodulator in the spatio-temporal neural network.

18. The first neural network device of claim 15, further configured to:
   receive the plurality of pulses from the second neural network device over the communications channel using an Address Event Representation (AER).

19. The first neural network device of claim 15, further configured to:
   control an appliance communicatively coupled to the first neural network device based on the modifying.

20. The first neural network device of claim 15, wherein the auditory signal is a human speech.

* * * * *

UNITED STATES PATENT AND TRADEMARK OFFICE
CERTIFICATE OF CORRECTION

| | |
|---|---|
| PATENT NO. | : 11,429,857 B2 |
| APPLICATION NO. | : 16/282550 |
| DATED | : August 30, 2022 |
| INVENTOR(S) | : van der Made et al. |

It is certified that error appears in the above-identified patent and that said Letters Patent is hereby corrected as shown below:

In the Claims

In Column 9, Lines 60–61, Claim 6, replace "the remote neural network artificial intelligent device" with --the remote neural network device--.

Signed and Sealed this
Twenty-fifth Day of October, 2022

Katherine Kelly Vidal
*Director of the United States Patent and Trademark Office*